(12) United States Patent
Legare et al.

(10) Patent No.: US 10,751,660 B2
(45) Date of Patent: Aug. 25, 2020

(54) FILTER CARTRIDGE COMPRISING FILTER MEDIA WITH ADHESIVELY EDGE-SEALED ENDS, AND METHOD OF MAKING AND USING

(71) Applicant: 3M INNOVATIVE PROPERTIES COMPANY, St. Paul, MN (US)

(72) Inventors: Pierre Legare, Brockville (CA); Gary E. Dwyer, Mallorytown (CA); Kevin A. Frankel, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 258 days.

(21) Appl. No.: 15/736,866

(22) PCT Filed: Jun. 30, 2016

(86) PCT No.: PCT/US2016/040278
§ 371 (c)(1),
(2) Date: Dec. 15, 2017

(87) PCT Pub. No.: WO2017/004313
PCT Pub. Date: Jan. 5, 2017

(65) Prior Publication Data
US 2018/0361295 A1    Dec. 20, 2018

Related U.S. Application Data

(60) Provisional application No. 62/186,566, filed on Jun. 30, 2015.

(51) Int. Cl.
*B01D 46/10*    (2006.01)
*A62B 23/02*    (2006.01)
(Continued)

(52) U.S. Cl.
CPC ............... *B01D 46/10* (2013.01); *A62B 7/10* (2013.01); *A62B 18/006* (2013.01); *A62B 18/02* (2013.01);
(Continued)

(58) Field of Classification Search
CPC ........... A62B 7/10; A62B 23/00; A62B 23/02; A62B 23/025
See application file for complete search history.

(56) References Cited

U.S. PATENT DOCUMENTS 314,485 A * 3/1885 Spencer ............... A62B 23/025
128/206.16
2,534,720 A    12/1950 Loose
(Continued)

FOREIGN PATENT DOCUMENTS

EP    1 275 428 A1    1/2003
GB    823887    11/1959
(Continued)

OTHER PUBLICATIONS

3M™ 3000 Series Half Mask Respirators and Filters, 3M Personal Safety, pp. 1-8.
(Continued)

*Primary Examiner* — Timothy A Stanis
*Assistant Examiner* — Thao Tran
(74) *Attorney, Agent, or Firm* — Kenneth B. Wood (57) ABSTRACT

A filter cartridge having a filter media with two opposing ends each being occluded by an adhesive edge seal.

27 Claims, 6 Drawing Sheets

(51) Int. Cl.
  *B01D 46/00* (2006.01)
  *A62B 7/10* (2006.01)
  *A62B 18/02* (2006.01)
  *B01D 46/52* (2006.01)
  *A62B 18/00* (2006.01)
  *A62B 18/08* (2006.01)

(52) U.S. Cl.
  CPC ............ *A62B 18/025* (2013.01); *A62B 18/08* (2013.01); *A62B 23/02* (2013.01); *B01D 46/0005* (2013.01); *B01D 46/0016* (2013.01); *B01D 46/103* (2013.01); *B01D 46/523* (2013.01); *B01D 2265/028* (2013.01); *B01D 2265/04* (2013.01); *B01D 2271/025* (2013.01); *B01D 2275/10* (2013.01)

(56) References Cited

U.S. PATENT DOCUMENTS

| | | | |
|---|---|---|---|
| 3,161,491 | A | 12/1964 | Gongoll |
| 3,216,578 | A | 11/1965 | Wright |
| 3,871,851 | A * | 3/1975 | Neumann ............... B01D 46/10 55/521 |
| RE30,782 | E | 10/1981 | Van Turnhout |
| 4,592,350 | A * | 6/1986 | Maryyanek ............ A62B 23/02 128/206.17 |
| 4,813,948 | A | 3/1989 | Inslay |
| 5,071,555 | A * | 12/1991 | Enbom ................. B01D 46/10 210/493.5 |
| 5,230,800 | A | 7/1993 | Nelson |
| 5,256,231 | A | 10/1993 | Gorman |
| 5,603,747 | A | 2/1997 | Matuda et al. |
| 5,619,989 | A | 4/1997 | Kruger |
| 5,679,122 | A * | 10/1997 | Moll .................... B60H 3/0608 55/497 |
| 5,782,944 | A * | 7/1998 | Justice ................. B01D 46/521 55/495 |
| 6,701,925 | B1 | 3/2004 | Resnick |
| 6,761,169 | B2 | 7/2004 | Eswarappa |
| 6,793,702 | B2 | 9/2004 | Eswarappa |
| 7,132,048 | B2 | 11/2006 | Hagashihara |
| 7,235,115 | B2 | 6/2007 | Duffy |
| 7,896,940 | B2 | 3/2011 | Sundet |
| 8,162,153 | B2 | 4/2012 | Fox |
| 8,230,860 | B2 * | 7/2012 | Dankert ................ A62B 23/02 128/206.17 |
| 8,312,876 | B2 | 11/2012 | Mutze |
| 8,668,756 | B2 | 3/2014 | Zou |
| 8,900,338 | B2 | 12/2014 | Lawrence |
| 2004/0011204 | A1 | 1/2004 | Both |
| 2005/0121029 | A1 * | 6/2005 | Reisman ............... A62B 17/04 128/201.22 |
| 2005/0161045 | A1 | 7/2005 | Viner |
| 2006/0196157 | A1 * | 9/2006 | Greer ................... A62B 23/02 55/500 |
| 2006/0283453 | A1 | 12/2006 | Haddad |
| 2007/0289273 | A1 | 12/2007 | Boyd |
| 2008/0038976 | A1 | 2/2008 | Berrigan |
| 2010/0300052 | A1 * | 12/2010 | Porter .................. B01D 46/10 55/499 |
| 2010/0313532 | A1 | 12/2010 | Stjernfelt |
| 2011/0126713 | A1 | 6/2011 | Legare |
| 2011/0138760 | A1 * | 6/2011 | Sundet ............... B01D 46/0001 55/486 |
| 2012/0260920 | A1 | 10/2012 | Choi |
| 2013/0087151 | A1 | 4/2013 | Klockseth |
| 2013/0125896 | A1 | 5/2013 | Dwyer |
| 2014/0041348 | A1 * | 2/2014 | Lawrence ............. A62B 18/08 55/493 |
| 2014/0165839 | A1 | 6/2014 | Crabtree |
| 2014/0216475 | A1 | 8/2014 | Blomberg |
| 2014/0261437 | A1 | 9/2014 | Catanzarite |
| 2015/0108682 | A1 * | 4/2015 | Spear ............... B29C 45/14336 264/248 |
| 2015/0136142 | A1 | 5/2015 | Blomberg |
| 2015/0314147 | A1 * | 11/2015 | Fleming ................ A62B 7/10 128/206.17 |

FOREIGN PATENT DOCUMENTS

| | | |
|---|---|---|
| JP | 04-18584 | 7/1985 |
| JP | 60-99946 | 7/1985 |
| WO | WO 2007-133903 | 11/2007 |
| WO | WO 2013-181080 | 12/2013 |
| WO | WO 2013-187278 | 12/2013 |
| WO | WO 2013-187279 | 12/2013 |
| WO | WO 2014-015401 | 1/2014 |
| WO | WO 2015-179141 | 11/2015 |
| WO | WO 2016-119080 | 8/2016 |

OTHER PUBLICATIONS

International Search Report for PCT International Application No. PCT/US2016/40278, dated Sep. 16, 2016, 2 pages.

Extended European Search Report, EP 16818748.2, dated Jan. 25, 2019, 3 pages.

* cited by examiner

FILTER CARTRIDGE COMPRISING FILTER MEDIA WITH ADHESIVELY EDGE-SEALED ENDS, AND METHOD OF MAKING AND USING

BACKGROUND

Respirators are often used for cleansing air to be breathed by a user, and commonly include a respirator body along with one or more respirator cartridges that are attached to the respirator body.

SUMMARY

In broad summary, herein is disclosed a filter cartridge having a filter media with two opposing ends each being occluded by an adhesive edge seal. In some particular aspects, herein is disclosed a filter cartridge comprising a pleated filter media with first and second corrugated ends and in which the first corrugated end of the pleated filter media is occluded by a first edge seal of hardened adhesive and the second corrugated end of the pleated filter media is occluded by a second edge seal of hardened adhesive. These and other aspects will be apparent from the detailed description below. In no event, however, should this summary be construed to limit the claimable subject matter, whether such subject matter is presented in claims in the application as initially filed or in claims that are amended or otherwise presented in prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "top", bottom", "upper", lower", "under", "over", "up" and "down", and "first" and "second" may be used in this disclosure, it should be understood that those terms are used in their relative sense only unless otherwise noted.

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

Glossary

The term "front" and like terms are also defined with respect to the respirator in which an item is used, and denotes a direction away from the face of a user wearing the respirator. The term "rear" and like terms denotes a direction toward the face of a user wearing the respirator.

Terms such as "inside", "inward", and the like, are defined with respect to a filter cartridge, and denote a direction toward the interior of a filter cartridge. Terms such as "outside", "outward", and the like, denote a direction away from the interior of a filter cartridge.

By "air-permeable" is meant allowing airflow therethrough, which may be achieved by any conventional means, e.g. the providing of perforated through-holes and the like.

By "occlude", "occlusive", and like terms is meant to block so that no air can flow therethrough.

The term "proximal", as applied to an item such as a cartridge housing, is defined with respect to the respirator body with which the item is used, and denotes an end of an item that is closest to the respirator body when the item is in position on the respirator body. The term "proximal" as applied to an adhesive edge seal is defined and described later herein.

By "removable" and like terms is meant that an item can be removed from (separated from) another item by hand by a user, without destroying or unacceptably damaging either of the items.

By "integral" and like terms is meant comprised of the same material and having been made together in a single operation, e.g. a molding operation.

DETAILED DESCRIPTION

Figure 1:
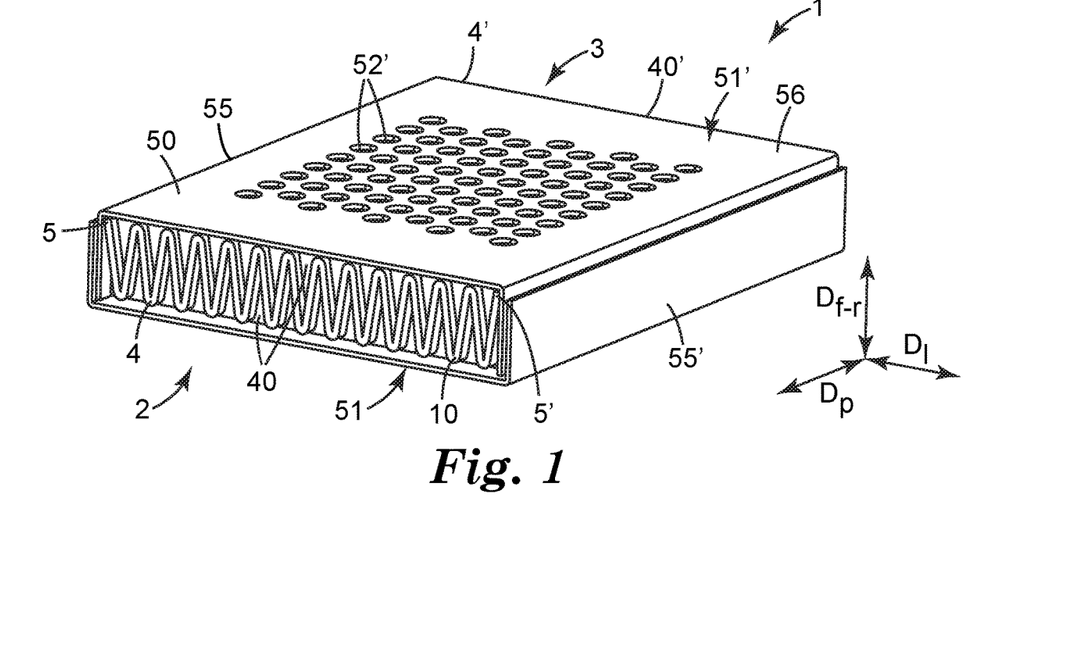
FIG. 1 is a perspective view of an exemplary filter cartridge.
Figure 2:
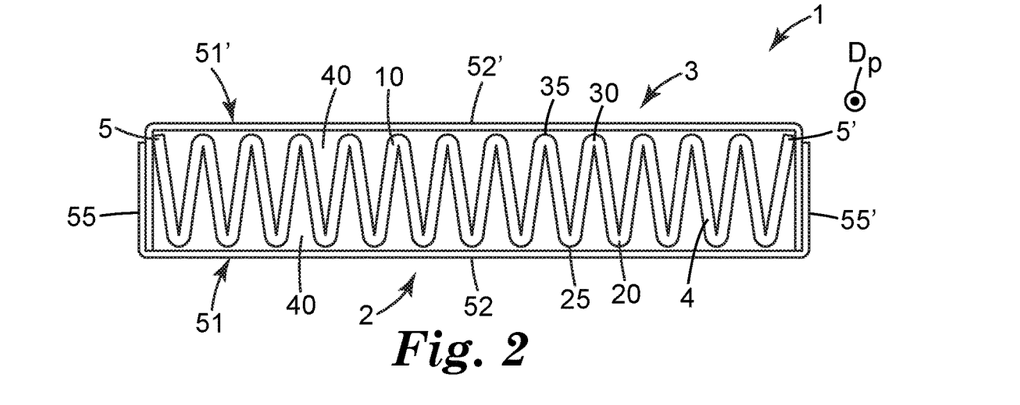
FIG. 2 is an elevation view, looking along the Pleat Direction, of the filter cartridge of FIG. 1.

Shown in FIG. 1 in perspective view and in FIG. 2 in elevation view is an exemplary filter cartridge 1 comprising pleated air filter media 10 that is partially encased in casing 50. In some embodiments filter cartridge 1 may be rectangular in shape (which specifically includes square shapes) with e.g. four corners; in such embodiments pleated filter media 10 may thus have a generally rectangular perimeter (which does not preclude irregularities, notches, chamfered or angled corners, or the like, in the perimeter of filter media 10). Pleated filter media 10 (and filter cartridge 1) comprises major ends/edges, e.g. four major ends as shown in FIGS. 1 and 2. Major ends/edges 4 and 4' (which terminate as exposed pleats) will be referred to herein as corrugated ends/edges, and major ends/edges 5 and 5' will be referred to as noncorrugated ends/edges.

Filter cartridge 1 comprises a first major face/side 2 and a second major face/side 3; pleated filter media 10 thus comprises a first major side 25 and a second major side 35. In many embodiments, filter cartridge 1 may be front-rear symmetrical, so that it may be installed in a filter cartridge housing (described later in detail) with first major side 2 facing frontwards, or with second major side 3 facing frontwards. That is, in such embodiments airflow may enter filter cartridge 1 on the first major side 2 and exit on the second major side 3, or vice versa. It will thus be appreciated that the designation of first and second major sides/faces of pleated media 10 and filter cartridge 1, is used for convenience of description and does not imply that the major sides/faces must differ in any substantial way.

Pleated filter media 10 may be made from any suitable pleatable media. Potentially suitable materials may include e.g. paper; porous films of thermoplastic or thermoset materials; nonwoven, such as melt blown or spunbond, webs of synthetic or natural fibers; scrims; woven or knitted materials; foams; electret or electrostatically charged materials; fibreglass media; or laminates or composites of two or more materials. A nonwoven polymeric web comprised of polyethylene, polypropylene or poly(lactic acid) may be suitable, for example. Any suitable method of making a nonwoven web (e.g., melt-blowing, melt-spinning, carding, and so on) may be used. Filter media 10 may also include sorbents, catalysts, and/or activated carbon (granules, fibers, fabric, and molded shapes).

Multilayer media, e.g. laminated media, can also be used as filter media 10. Such media may consist of laminated layers of the media discussed above or of other substrates laminated to one or more layers of filter media, for example. In some embodiments, a prefilter layer may be used on the upstream side of filter media 10. Such a prefilter layer may comprise e.g. polypropylene, polyethylene, polyethylene terephthalate, poly(lactic acid), or blends of these materials; or it may comprise fibreglass. In other words, in some embodiments pleated filter media 10 may comprise a base (e.g., filtration) layer, along with any other layer or layers as desired for any purpose. For example, a highly open plastic netting or mesh might be laminated to the pleated media, in order to e g enhance the abrasion resistance of the media. Any such layer may be bonded to e.g. a base (e.g. filtration) layer by any suitable method, e.g. by melt-bonding, by way of an adhesive (hot melt adhesive, pressure-sensitive adhesive, and so on), calendering, ultrasonic bonding, etc.

In specific embodiments, pleated filter media 10 may be an electret material, comprised of e.g. any charged material, e.g. split fibrillated charged fibers as described in U.S. Pat. RE 30782. Such charged fibers can be formed into a nonwoven web by conventional means and optionally joined to a scrim such as disclosed in U.S. Pat. No. 5,230,800 forming an outer support layer. In other specific embodiments, filter media 10 can be a melt blown microfiber nonwoven web, e.g. such as disclosed in U.S. Pat. No. 4,813,948, which can optionally be joined to a secondary layer during web formation as disclosed in that patent, or subsequently joined to a secondary web in any conventional manner. Filter media that may be particularly suitable for certain applications might include e.g. media of the general type described in U.S. Pat. No. 8,162,153 to Fox; media of the general type described in U.S. Patent Application Publication 20080038976 to Berrigan; and, media of the general type described in U.S. Patent Application Publication 20040011204 to Both, and media generally known as tribocharged media. Any such media can be charged to form an electret, if desired. The pleated filter media may be configured to filter (e.g., capture) particles, vapors, or gases, or any combination thereof. Other (e.g., non-pleated) filter media are discussed later herein.

In at least some embodiments, pleated filter media 10 does not comprise any type of structure that is pleated along with the pleated filter media that serves to stabilize the pleat spacing (e.g., a supporting or reinforcing layer such as e.g., a wire mesh or the like, as is often found on the downstream side of pleated filter media). That is, in such embodiments the hardened adhesive seals (along with the casing) can provide sufficient stabilization of the pleated filter that no such pleat-stabilizing layer that is pleated along with the filter media is needed.

Figure 3:
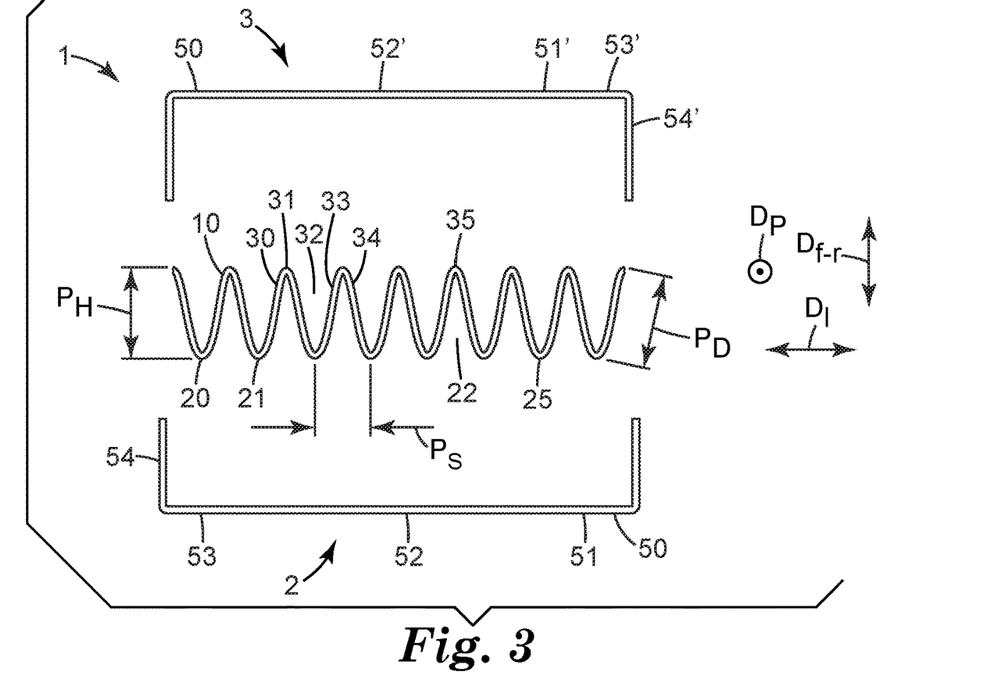
FIG. 3 is a partially exploded view of the filter cartridge of FIG. 2, with the casing exploded away from the filter media.

As shown in FIGS. 1 and 2 and in particular in FIG. 3 (in which the casing 50 has been exploded away from the pleated filter media 10), pleated filter media 10 comprises a plurality of first-side pleats 20 and second-side pleats 30. Each first-side pleat 20 comprises a first-side pleat tip 21 and each adjacent pair of first-side pleats 20 defines a first-side pleat valley 22 therebetween. Second-side pleats 30 are in oppositely-facing configuration from first-side pleats 20. Each second-side pleat 30 comprises a second-side pleat tip 31 and each adjacent pair of second-side pleats 30 defines a second-side pleat valley 32 therebetween. As used herein, the Pleat Direction ($D_p$ in FIG. 3) is a direction that is aligned with the long axis of the pleat tips (and that typically runs from one corrugated end 4 to the other corrugated end 4' of the pleated filter media). The lateral direction ($D_l$ in FIG. 3) is a direction that is orthogonal to the long axis of the pleat tips (and that typically runs from one noncorrugated end 5 to the other noncorrugated end 5' of the pleated filter media). The front-rear direction ($D_{f-r}$ in FIG. 3) is a direction extending through the filter cartridge from the first major face 2 to the second major face 3, and typically corresponds to the overall direction of air flow through the filter cartridge.

Further details of pleat geometry are discussed with reference to the side view of FIG. 3 (in which the pleated air filter media is viewed along the pleat direction $D_p$ and the below-described adhesive seals are omitted for clarity). Pleat spacing, pleat height, and pleat distance as defined herein are evaluated with the pleated air filter media 10 in a nominally planar configuration in which the pleated filter media 10 exhibits a readily recognizable overall major plane (notwithstanding the local deviations from this plane that are inherent in each pleat), as in FIG. 3. The pleat height (pleat amplitude) is the distance ($P_h$ in FIG. 3) from a first-side pleat tip 21 to a second-side pleat tip 31, along a direction that is orthogonal to the overall major plane of filter media 10 (i.e., along a direction that is aligned with the front-rear direction $D_{f-r}$ of the pleated media). In various embodiments, the pleat height of media 10 may be at least about 2, 4, 6, 8 or 10 mm. In further embodiments, the pleat height may be at most about 45, 40, 35, 30, 25, 20, 15, 12, 10, 8, or 6 mm.

The pleat spacing ($P_s$ in FIG. 3) is the distance between nearest-neighbor same-side pleat tips, along a direction that is aligned with the major plane of the filter media (i.e., along the lateral direction $D_l$ of the pleated media). Pleated filter media 10 may comprise any suitable pleat spacing. In various embodiments the pleat spacing may be at most about 20, 15, 10, 8, 6, 4, 3, or 2 mm; in further embodiments the pleat spacing may be at least about 1, 2, 3, 4, 5, 6, 8, or 10 mm. The pleat distance ($P_d$ in FIG. 3) is the shortest distance from one pleat tip to a nearest-neighbor pleat tip along the local direction of the pleated media (by way of specific example, if the first pleat tip is a first-side pleat tip its nearest-neighbor pleat tip for purposes of this measurement will be a second-side pleat tip). Pleated filter media 10 may comprise any suitable pleat distance (although, for any given pleated filter media, the pleat distance may be very close to, or somewhat larger than, the pleat height). In various embodiments, the pleat distance of media 10 can be at least about 2, 4, 6, 8 or 10 mm. In further embodiments, the pleat distance may be at most about 45, 40, 35, 30, 25, 20, 15, 12, 10, 8, or 6 mm.

Figure 5:
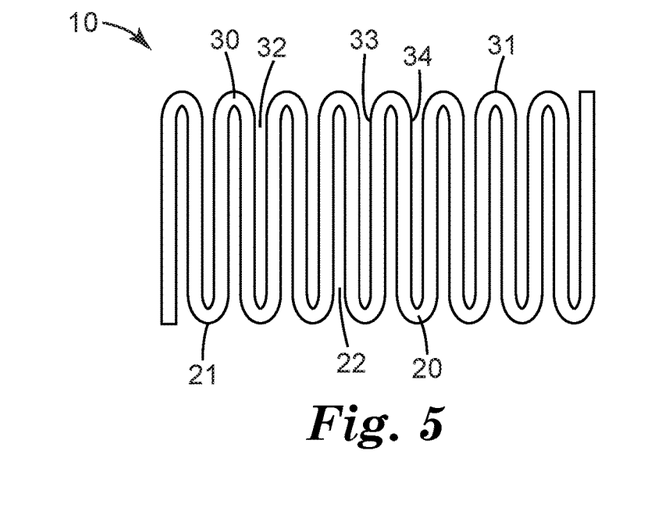
FIG. 5 is a is an elevation view, looking along the Pleat Direction, of an exemplary pleated filter media.

In some embodiments the pleat tips of pleated media 10 may have an average radius of curvature that is less than about 3 mm. In various embodiments, such pleats may comprise tips with an average radius of curvature of at most about 2.5, 2.0, 1.5, 1.0, or 0.5 mm. In some embodiments media 10 may be tightly pleated, meaning that the pleat tips exhibit a very small radius of curvature and the pleat spacing is very small, both in comparison to the pleat height. In various embodiments, the pleated media 10 may exhibit a pleat tip radius of curvature that is less than about 2 mm, and/or a pleat spacing that is less than about 3 mm, and a pleat height that is from about 6 mm to about 16 mm. In further embodiments, the pleated media 10 may exhibit a pleat tip radius of curvature that is no greater than about 1 mm, a pleat spacing that is no greater than about 2 mm, and a pleat height that is from about 10 mm to about 14 mm. In various embodiments, the ratio of the pleat height to the pleat spacing may be at least about 4, 5, 6, 7, 8, or 10. In embodiments in which media 10 is tightly pleated, adjacent walls of a pleat (e.g., walls 33 and 34 as shown in FIG. 5) may be at least substantially parallel to each other over at least about 90% of the pleat distance of each wall. Such a tightly pleated media is shown in idealized representation in FIG. 5. In such a tightly pleated media, the maximum width of a pleat valley (e.g., valley 22 or valley 32), measured along the lateral direction Di of the media, may be less than 3.0, 2.0, 1.5, or even 1.0 mm. It has been found that even a tightly pleated media as described herein, can still allow adequate air flow therethrough at a reasonably low pressure drop.

Filter media 10 can be pleated by any suitable method. Such methods might include the processing of the media through a set of corrugating gears, e.g. in any suitable variation of the methods disclosed in e.g. U.S. Pat. No. 5,256,231 or in U.S. Pat. No. 7,235,115. Or, it may be folded by an accordion-style pleated system, e.g. an apparatus employing reciprocating blades. The media may be e.g. scored to provide a score line, along which the media can be folded to form a very sharp pleat tip with a small radius of curvature, if desired.

As seen most easily in the view of FIG. 4, in which the second-side casing (described later in detail) has been omitted, filter cartridge 1 comprises a first adhesive edge seal 40, and a second adhesive edge seal 40'. Each adhesive edge seal is located proximate a corrugated end (4 or 4') of the pleated filter media, and serves to occlude that corrugated end so that air cannot flow into or out of the filter cartridge through that end. Each seal is comprised of a hardened adhesive. In many embodiments, the adhesive may be applied as a bead proximate an edge of the filter media, which media may then be compressed along the lateral direction of the media which causes the adhesive (as yet unhardened) to completely fill each pleat valley at a location proximate a corrugated end of the pleated filter media. The adhesive may then be hardened while the filter media is held in this pleated configuration, so that the hardened adhesive completely occludes each pleat valley. In at least some embodiments, adhesive may be applied to the first side of the pleated media, and to the second side of the pleated media, so as to form adhesive seal portions that fill both the first-side pleat valleys and the second-side pleat valleys and that thus collectively provide adhesive seal 40.

It will be appreciated that the use of hardened adhesive edge seals 40 in this manner may eliminate the need to provide casing portions (described below) to occlude the first and second corrugated ends/edges 4 and 4' of the pleated filter media. That is, the hardened adhesive seals can serve this occluding function, which allows the complexity and cost of the casing to be reduced. Moreover, the hardened adhesive seals can provide structural rigidity to the pleated air filter media, which can make the resulting filter cartridge more mechanically robust, without e.g. having to use a thick casing material that might add undesirable weight and/or cost. It is further noted that the presence of such adhesive seals can allow the achievement of a tight pleating pattern as discussed above (e.g. in which the pleat spacing is quite small and the walls of pleats are at least substantially parallel to each other). This is because if a very tight pleating pattern is attempted, the adhesive can act as a spacer to ensure that adjacent walls of pleats are not pushed completely against each other so that they are so closely spaced (e.g. touching each other) so as to disadvantageously block air flow into the pleat valleys.

First adhesive edge seal 40, and second adhesive edge seal 40' of the particular type discussed above (and as pictured e.g. in FIG. 4), are each respectively located "inwardly proximate" a corrugated end of pleated filter media 10. By this is meant that each seal is located laterally even with, or slightly laterally inward from, the terminal edge of the corrugated end. To achieve this, each seal may be produced by depositing an adhesive bead onto a major surface of the pleated media (along a line that may be located from even with the corrugated end, to about 4 mm laterally inward from the corrugated end) as described above (and then laterally compressing the pleated media if desired). This will be contrasted with e.g. applying adhesive edgewise (so that it flows along the pleat direction of the pleated media) to the corrugated edge of the pleated filter media e.g. by dipping the pleated filter media in the adhesive. In other words, an "inwardly proximate" adhesive edge seal will not have any portion that extends outward along the pleat direction of the pleated media, beyond the terminal edges of the corrugated ends of the pleated media (except for such portions as may randomly occur occasionally, in any industrial process of this type). In such embodiments, each adhesive edge seal may be located at a position from about even with the terminal edges of a corrugated end, to a position that is recessed laterally inward from the terminal edges of the corrugated end, a distance of from about 0.1 mm, 0.2 mm, 0.4 mm, 0.6 mm, 0.8 mm, or 1.0 mm, to about 10, 8, 6, 4, 2, or 1.0 mm. By way of specific example, exemplary adhesive edge seals 40 and 40' as shown in FIG. 4 are located a few mm inward from the terminal edges of corrugated ends 4 and 4', and no portion of the adhesive edge seal extends outward beyond the terminal edges of the corrugated ends.

The width of an adhesive edge seal (along the pleat direction of the media) may be any suitable value, for example, about 0.5, 1.0, 1.5, 2.0, 2.5, or 3.0 mm. In some embodiments, substantially all of the adhesive may be located within a pleat valley (e.g., as shown in the exemplary embodiment of FIG. 2). In other embodiments, at least some of the adhesive may be located outward (in the front-rear direction of the pleated media) from at least some of the pleat tips.

Figure 4:
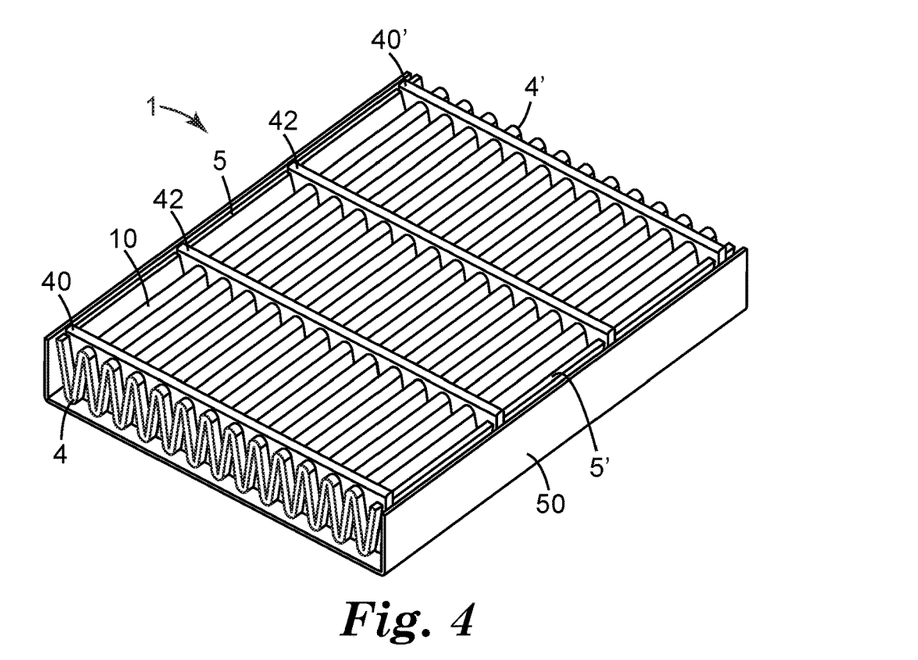
FIG. 4 is a perspective view of the filter cartridge of FIG. 1, with a portion of the casing omitted.

If desired, one or more additional adhesive "seals" (interior dams) 42 can be provided in between the first and second adhesive edge seals as shown in FIG. 4. Although not necessarily needed for any occluding function, such additional, interior adhesive seals may provide additional stiffness and mechanical rigidity to the pleated filter cartridge, and may also assist in maintaining the pleats of the filter media in e.g. a tightly pleated configuration (e.g. a configuration of the type shown in exemplary representation in FIG. 5). The adhesive seals may be spaced at least generally uniformly across the lateral extent of the pleated filter media (as in the exemplary embodiment of FIG. 4), if desired.

The term "adhesive" is used broadly to signify any material that can be deposited, e.g. as a bead, onto a major surface of pleated media 10 in a state (e.g., liquid, molten, softened, or semi-softened) in which it is sufficiently flowable or deformable that it can penetrate sufficiently into pleat valleys to satisfactorily (e.g., fully) occlude a corrugated edge as described above. Any suitable material may be used, including e.g. hot-melt adhesives, UV-cure adhesives, thermally-curved adhesives, moisture-cure adhesives, and so on. The adhesive is specifically not required to exhibit any pressure-sensitive adhesive functionality after being hardened; in other words, the adhesive may be a non-tacky, e.g. hard material after being hardened. In at least some embodiments, the adhesive may be deposited as a bead that extends along the lateral direction of the pleated media, e.g. by passing the media underneath an adhesive-deposition nozzle or by moving the adhesive-deposition nozzle along the media.

In some embodiments the adhesive may be applied while the pleated media is held at a relatively open pleating pattern (that is, with a fairly large pleat spacing), with the pleated media then being compressed along the lateral direction to achieve the final (e.g. tighter) pleating pattern, after which the adhesive is then allowed to harden. In other embodiments, the media may not yet be pleated (but may have been scored to render it pleatable) when the adhesive is applied; in other words, the adhesive may be applied when the media is still in a flat, unpleated configuration. Thus, even if the pleated filter media 10 is e.g. scored at predetermined intervals that are chosen with a particular, tight pleating pattern in mind, the media may not necessarily be fully formed into the final pleating pattern until after the adhesive beads are deposited thereon. However, in still other embodiments (e.g., if the adhesive is very low viscosity and able to penetrate deeply into pleat valleys) the adhesive may be applied with the pleated media already in its final pleated configuration.

As noted, the adhesive may be deposited using any suitable method. In some convenient embodiments, the adhesive may be a hot-melt adhesive that is deposited through e.g. conventional hot-melt deposition, after which the adhesive is cooled to harden. In some embodiments, the methods described in U.S. Pat. No. 7,235,115 to Duffy may be used, albeit in such a manner that the adhesive sufficiently (e.g., fully) occludes the pleat valleys in the final filter cartridge (i.e., when the final pleat spacing is achieved). In some embodiments the adhesive beads may be deposited (e.g., melt-extruded) onto the filter media while the media is still resident on a corrugating (pleating) gear or any other kind of corrugating apparatus.

Filter cartridge 1 comprises casing 50. Casing 50 comprises a first major portion 51 that that resides outwardly of the first major side 25 of the pleated filter media and includes a first air-permeable area 52, with a second major portion 51' that resides outwardly of the second major side 35 of the pleated filter media and that includes a second air-permeable area 52'. Casing 50 also includes a first edge portion 55 that resides outwardly of, and occludes, the first noncorrugated end 5 of the pleated filter media, and includes a second edge portion 55' that resides outwardly of, and occludes, the second noncorrugated end 5' of the pleated filter media. It will thus be appreciated that casing 50 covers four of the six faces of the filter cartridge—both major sides/faces 2 and 3, and both noncorrugated ends 5 and 5'. However, owing to the presence of the above-described adhesive edge seals 40 and 40', it is not necessary that casing 50 must cover, (e.g., occlude) the corrugated edges 4 and 4'. The casing 50 may therefore be of a simple and inexpensive design.

In the exemplary embodiment of FIG. 3, casing 50 is seen to be provided by first and second casing parts 53 and 53', each of which has a major portion (51 and 51') and has flanges 54 and 54' that will outwardly cover and occlude noncorrugated edges 5 and 5' (that is, that will provide casing portions 55). If desired, flanges of each casing part may overlap each other (as in the exemplary design of FIG. 3). The two casing parts may be attached to each other (e.g. by adhesive, by stapling, or by any convenient means) and/or one or both of the casing parts may be attached to the pleated filter media 10 (e.g. by adhesive, by stapling, or by any convenient means). If desired, the casing parts may be scored at locations at which they are to bend around the corners of the noncorrugated edges of the pleated filter cartridge. Although the exemplary design of FIG. 3 illustrates a casing that is provided by way of two casing parts, if desired a casing may be made by using a single piece of e.g. paperboard that is wrapped completely around the two major faces, and the two noncorrugated ends, of the pleated filter media. Or, more than two casing parts may be used in combination. Regardless of the design, by definition the casing 50 is provided as part of the filter cartridge 1, is not designed to be removable therefrom, and is not a part of e.g. a cartridge housing of a respirator.

Casing 50 may be made of any suitable material, e.g. plastic, paperboard, or the like. In specific embodiments, casing 50 is made of paperboard. In various embodiments, the thickness of casing 50 may be in the range of 0.1 to 1.0 mm, or in the range of 0.2 to 0.8 mm, or in the range of 0.4 to 0.6 mm. In some embodiments, each major portion 51 and 51' may have a "picture-frame" border 56 that surrounds the air-permeable area 51 and 51', for purposes explained in detail later herein. In various embodiments, the percent open area of air-permeable areas 51 and 51' (measured from the edge of the air-permeable area, not including any picture frame border) may be e.g. at least about 15, 25 or 35%. In further embodiments, such a percent open area may be at most about 65, 55, or 45%.

Filter cartridge 1 may be used in any suitable respirator. Shown in FIG. 6 in front perspective partially exploded view is an exemplary respirator 300 that comprises two filter cartridges (not visible in this Figure) that are respectively contained in cartridge housings 60 and 60' located on generally opposed sides of respirator body 310. However, in some embodiments such a respirator may include only a single filter cartridge and cartridge housing, which may be located symmetrically or asymmetrically with respect to the respirator body 310. In the illustrated embodiment exemplary respirator 300 is a half mask respirator. However, a filter cartridge 1 as disclosed herein may be used with any type of respirator, including e.g. a full mask respirator, a powered air respirator, and so on.

Figure 7:
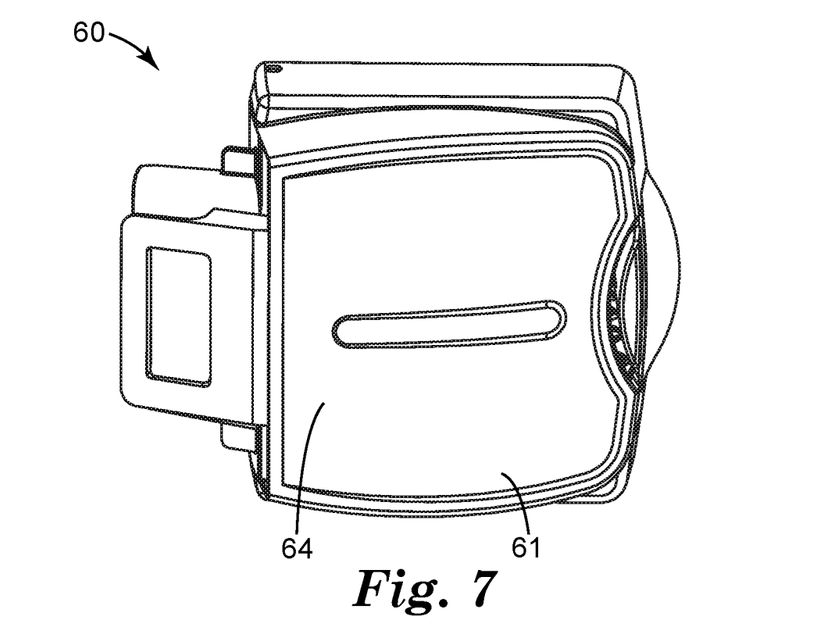
FIG. 7 is a front perspective view of an exemplary cartridge housing.
Figure 8:
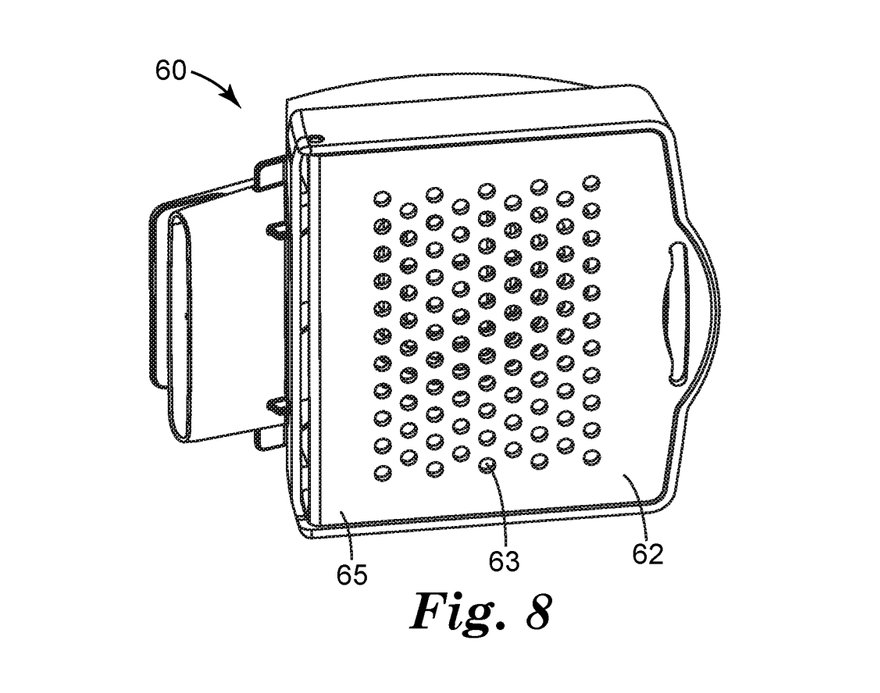
FIG. 8 is a rear perspective view of an exemplary cartridge housing.

As noted, filter cartridge 1 is located in a cartridge housing (holder) 60. It will be appreciated that cartridge housing 60 is not a part of the filter cartridge 1 itself and in particular is not non-removably attached to filter cartridge 1. Rather, housing 60 is configured to receive a filter cartridge 1 and to fluidically connect the filter cartridge to a respirator body, as discussed in detail below. An exemplary cartridge housing 60 is shown in front view in FIG. 7, and in rear view in FIG. 8. Front side 61 of cartridge housing is air-impermeable, while rear side 62 of cartridge housing 60 comprises an air-permeable area 63 (which may conveniently be achieved by providing numerous through-perforations in area 63 of rear side 62 of cartridge housing 60, as shown in FIG. 8). It will be appreciated that locating the air-permeable side of the filter cartridge housing on the rear side of the cartridge housing (that is, the side toward the wearer's face) can advantageously shield the filter cartridge from splashes of liquid, from debris emitted by industrial processes (e.g. such as grinding), from sparks from welding, and so on.

As noted, air-permeable areas 52 and 52' of filter cartridge casing 50 may be made air-permeable by way of providing numerous though-perforations in these areas. Similarly, air-permeable area 63 of rear side 62 of cartridge housing 60, may likewise be made air-permeable by providing numerous through-perforations therein. In at least some embodiments, the through-perforations of area 63 of the cartridge housing, may be at least partially, or fully, registered with the through-perforations of area 52 (or 52') of the filter cartridge casing. However, this may not be strictly necessary; that is, adequate air flow may be achieved even without the respective through-perforations necessarily being registered with each other.

As noted, filter cartridge 1 is configured to reside within a cartridge housing 60 for use in a respirator. As seen most easily in FIG. 9, in some embodiments such a cartridge housing may comprise a first housing portion 64 with a front-facing major side 61 that is air-impermeable, and may further comprise a second housing portion 65 with a rear-facing major side 62 that has an air-permeable area 63. In embodiments of the general type shown in FIG. 9, the first housing portion 64 is a major housing portion, and second housing portion 65 is a lid. In the illustrated embodiment of FIG. 9, lid 65 is hingedly connected to major housing portion 64 in clamshell fashion, such that lid 65 can be rotated about the hinged connection to housing portion 64, far enough to be opened so that a filter cartridge 1 can be removed and a replacement filter cartridge 1 inserted. However, it is emphasized that this is merely an exemplary embodiment and that, for example, lid 65 may be attachable and detachable from major housing portion 64 (e.g., by a snap-fit) rather than being hingedly connected thereto. If a lid is hingedly connected to major housing portion 64, the lid may be a separately-made item (that may if desired be comprised of a different material from that of portion 64), with the lid and portion 64 having complementary mating features that provide a hinged connection. In other embodiments, the lid and major housing portion 64 may be made of the same material, and in some embodiments may be molded as one unit with a living hinge that provides a hinged connection between the two portions of the unit.

Figure 9:
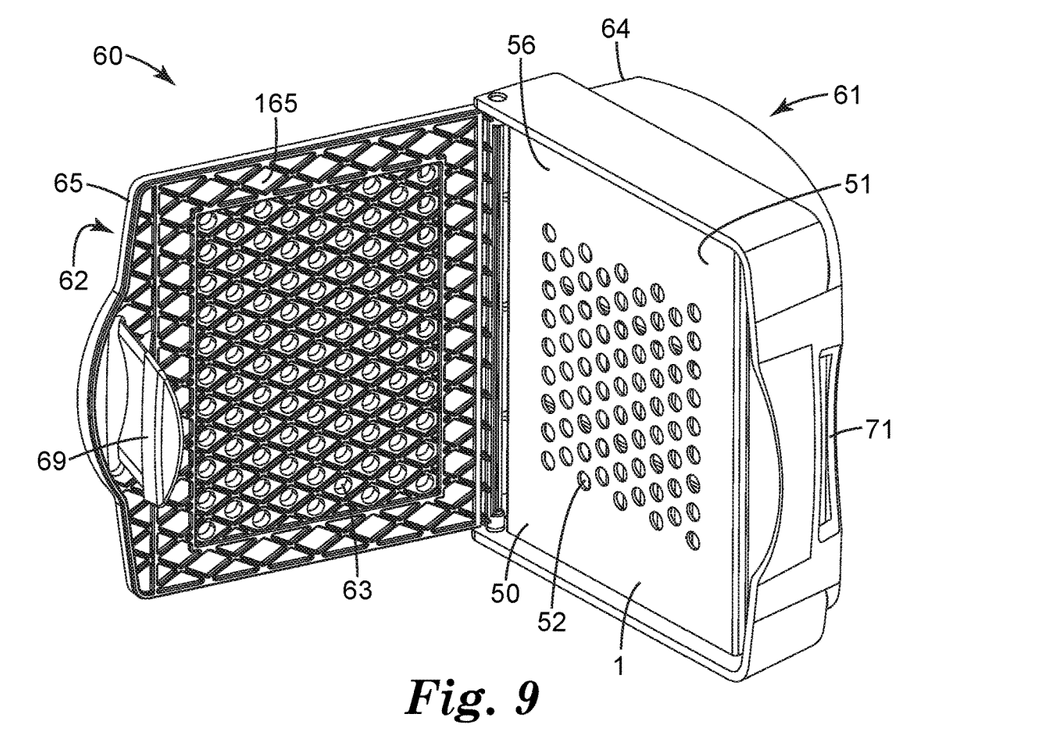
FIG. 9 is a perspective view of an exemplary cartridge housing, with a lid portion in an opened position.

Whatever the specific design, cartridge housing 60 may comprise a second housing portion 65 (e.g., a lid) that is movable relative to the first housing portion 64 between a first, open position in which a filter cartridge 1 can be installed into the cartridge housing, and a second, closed position in which the filter cartridge is securely held (sandwiched) within the cartridge housing. In at least some embodiments, the above arrangements may hold filter cartridge 1 sandwiched between a front-facing surface of the first housing portion 64 and a rear-facing surface of the second housing portion. In particular embodiments, a first and/or second housing portions may include one or more compressing structures that are configured to press a particular area of the filter cartridge against a receiving structure of the other housing portion. For example, a lid 65 may comprise an area (e.g. a perimeter area 165 as shown in FIG. 9) that presses a portion, e.g. a perimeter portion (picture frame border) 56, of filter cartridge 1 against a receiving structure 66 of major housing portion 64 when the lid is closed. In some embodiments, such a compressing structure 165 may at least partially, or completely, bound (surround) air-permeable major area 52 of filter cartridge casing 1; similarly, such a receiving structure 66 may at least partially, or completely, bound air-permeable major area 52' of filter cartridge casing 50. Such arrangements may serve e.g. to minimize any air leaks around the filter cartridge.

The terms compressing structure and receiving structure are used broadly and encompass any suitable design. In some embodiments at least a portion of such a compressing structure may stand proud of (i.e., may protrude inward from) other components or surfaces of that housing portion. In other embodiments such a compressing structure may merely be a particular region of an inward-facing surface of the housing portion, that does not necessarily protrude inward beyond other portions of the inward-facing surface. Similar considerations apply to the receiving structure. (In fact, in some designs the terms compressing structure and receiving structure may be interchangeable.)

Figure 10:
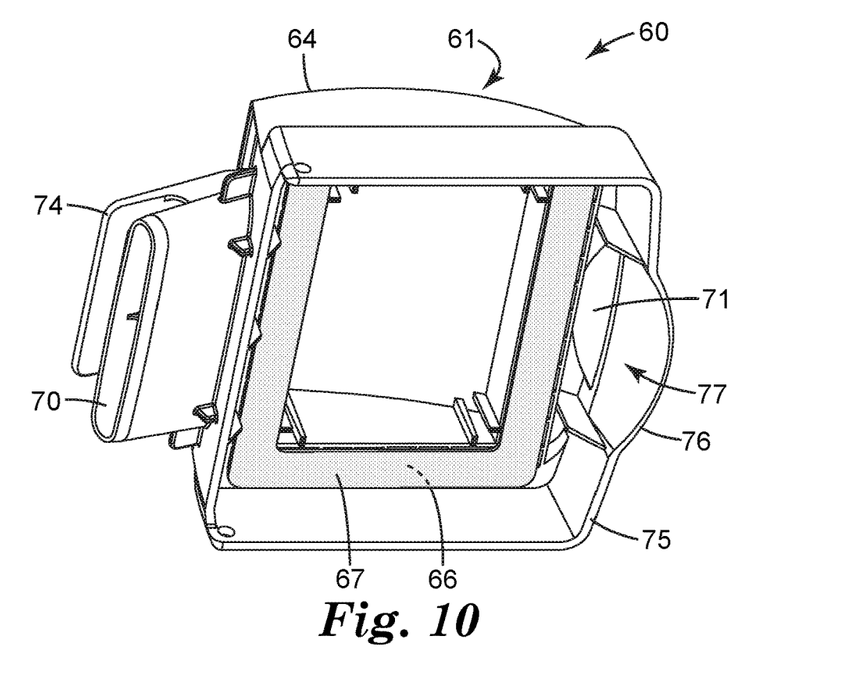
FIG. 10 is a perspective view of a major housing portion of an exemplary cartridge housing, with the lid and the filter cartridge omitted.

In some embodiments (such as shown in FIG. 10) a gasket 67 may be provided on a compressing structure or a receiving structure of a housing portion of the cartridge housing. Such a gasket may be permanently attached to first housing portion 64 (or to second housing portion 65) of the cartridge housing; or, it may be removable and replaceable if desired. Alternatively, such a gasket may be provided along with the filter cartridge (e.g., attached thereto) so that it is removed along with the filter cartridge and a new filter cartridge/gasket inserted. Such a gasket may be made of a resilient polymeric material such as rubber, silicone, or the like. The polymeric material may be solid, or may be a foam. If a foam, it may be an open-cell foam, or a closed cell foam.

In the illustrative embodiment of FIG. 10, receiving structure 66 of the first housing portion 64 is a flat receiving surface that is designed to receive picture frame perimeter 56 of filter cartridge 1, and gasket 67 is provided on receiving surface 66. Such arrangements can enhance the ability to fit filter cartridge 1 within filter cartridge housing 60 so as to minimize or eliminate any leakage around the edges of the filter cartridge; in other words, to ensure that any air that reaches the respirator body may only do so by way of passing through the pleated filter media 10.

If desired, one or more latches may be provided to ensure that the first and second housing portions are securely latched to each other when the portions are in the closed position. Such latches may take any suitable form. In some embodiments, a latch may be provided collectively by complementary mating features, a first one of which is e.g. integrally molded with the first portion 64 of the housing, a second of which is e.g. integrally molded with the second portion 65 of the housing. In an exemplary embodiment of this type, second (e.g., lid) housing portion 65 may comprise a deflectable tongue 69 (most easily seen in FIG. 9) that, when the lid is closed, fits into a slot 71 (most easily seen in FIG. 10) while being slightly deflected in the process so as to snap in place in the slot. A user of the respirator can the manually deflect tongue 69 so allow the lid to be opened.

In some embodiments filter cartridge 1 may be held sandwiched in place between the first housing portion and the second housing portion purely by the pressure exerted by the housing portions as described above. However, in other embodiments, one or more ancillary mechanisms (e.g., latches, clasps, snaps, pincers, pins, and the like) may be used to enhance the holding of filter cartridge 1 in place. Similarly, any type of adhesive, mechanical fastener (e.g., hook and loop fastener) and the like may be used to such effect.

Figure 11:
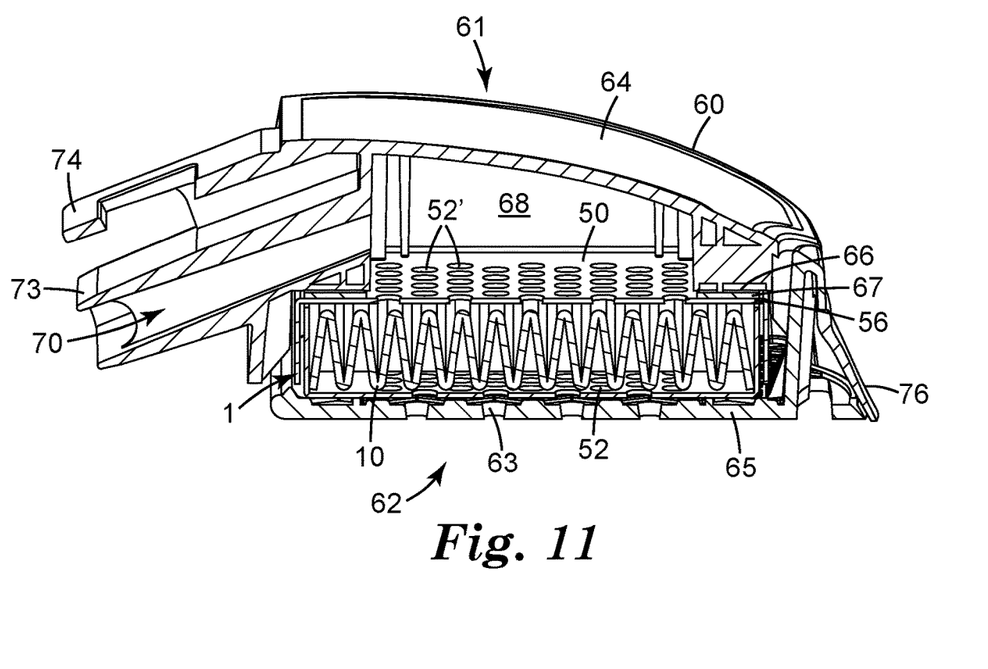
FIG. 11 is a cross-sectional slice view of an exemplary cartridge housing with an exemplary pleated filter cartridge installed therein.

FIG. 11 is a cross-sectional slice view that shows an exemplary arrangement of filter cartridge 1 within cartridge housing 60. Unfiltered air enters the cartridge housing 60 through the through-perforations of air-permeable area 63 of rear side 62 of the cartridge housing. From there the air passes through the through-perforations of first air-permeable area 52 of filter cartridge 1. The air then passes through the filter media 10 and is filtered thereby. The filtered air then exits the filter cartridge 1 through the through-perforations of second air-permeable area 52', and enters plenum 68 of the cartridge housing 60. The air then flows through passage 70, which fluidly connects plenum 68 to respirator body 310. (It will be appreciated that with a front-rear reversible filter cartridge as described earlier, the filter cartridge could be front-rear flipped and would still function as described.)

In some embodiments, filter cartridge 1 may be the only filtering component that resides within cartridge housing 60. However, in other embodiments, one or more layers of material may reside within cartridge housing 60 (e.g., in overlapping relation to, e.g. butted up against a major surface of, filter cartridge 1) for some additional purpose. Such a layer or layers may contain one or more materials that interact with a gaseous fluid (e.g. an airstream) to at least partially remove one or more components (e.g., gases, vapors, solid particles, aerosols, and so on) therefrom. The components in the fluid may be e.g. sorbed onto or into an active sorbent, may be reacted with a reactive ingredient, may be exposed to a catalyst, and so on. Potentially suitable materials for such uses include e.g., activated carbon; alumina and other metal oxides; sodium bicarbonate; metal particles (e.g., silver particles) that can remove a component from a fluid by adsorption, chemical reaction, or amalgamation; catalytic agents such as hopcalite and/or gold (which can catalyze the oxidation of carbon monoxide); clay and other minerals treated with acidic solutions such as acetic acid or alkaline solutions such as aqueous sodium hydroxide; ion exchange resins; molecular sieves and other zeolites; silica; biocides; fungicides and virucides. Mixtures of any such materials can be employed. In other embodiments, such materials may be provided as particles in a particle-loaded web layer. Combinations of any of these approaches may be used. If desired, such materials may be treated e.g. with one or more impregnants to enhance gas removal capability. Examples of treated materials include chemically surface-treated activated carbon.

In many embodiments, flowing air will locally approach filter cartridge 1, and will locally leave filter cartridge 1, along a direction that is at least generally aligned with the front-rear direction $D_{f-r}$ of the filter cartridge. If the filter media is pleated, such a direction will often be at least generally orthogonal to the pleat direction $D_p$ of the pleated filter media 10. That is, in ordinary use of a pleated filter cartridge 1, there may often be little or no airflow along the long axis of the valleys of the pleated media. In particular, pleated filter cartridge 1 is distinguished from arrangements in which a fluid flows along the valleys in between multiple layers (e.g., stacks or wraps) of pleated media. Pleated filter cartridge 1 is thus distinguished from e.g. so-called spiral-wound filters and the like that, as supplied, comprise multiple layers of filter media and in which substantial fluid flow may occur along the long axis of the valleys of the pleated media. Thus in at least some embodiments, filter cartridge 1 will include only a single layer of pleated media 10 (although pleated media 10 itself may be a multilayer material). Still further, pleated filter cartridge 1 is distinguished from e.g. so-called pleated filter inserts that are provided in an accordionized (folded together) condition (e.g. for ease of packaging and shipping) and that are configured to be expanded (e.g., into a nominally planar configuration) e.g. to be fitted into a frame.

Figure 6:
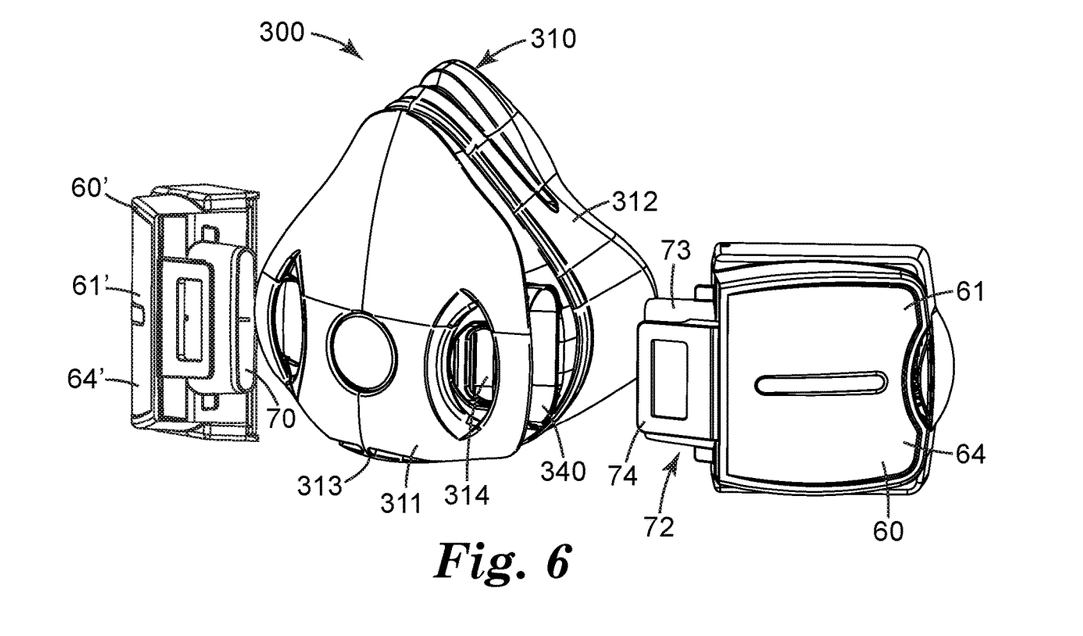
FIG. 6 is a front perspective partially exploded view of an exemplary respirator comprising an exemplary cartridge housing.

Shown in FIG. 6 in front perspective partially exploded view is an exemplary respirator 300 that comprises two filter cartridge housings 60 (that are shown disengaged from respirator body 310). In the illustrated embodiment exemplary respirator 300 is a half mask respirator that may be worn by a user to cover the nose and mouth and to define an interior air space. However, a filter cartridge 1 and cartridge housing 60 as disclosed herein may be used with any type of respirator, including e.g. a full mask respirator, a powered air respirator, and so on. In some embodiments, respirator body 310 may include one or more at least semi-rigid portions 311 and a resilient face-contacting portion 312. An exhalation valve 313 may be provided to allow exhaled air to be discharged from an interior air space. Respirator 300 may also include a harness assembly (not shown) that is able to support respirator body 310 on a user's head.

A cartridge housing 60 may be fluidically coupled with a respirator body 310 in any desired manner. For example, as depicted in FIG. 6, respirator body 310 may include one or more receivers 340 that are each configured to receive a nozzle 73 of a cartridge housing 60. Cartridge housing nozzle 73 may cooperate with receiver 340 to provide an airflow channel from cartridge housing 60 to respirator body 310. Arrangements of this type are described in further detail in U.S. patent application Ser. No. 13/757,434, filed 1 Feb. 2013 and entitled Sleeve-Fit Respirator Cartridge. In some embodiments, a receiver 340 of this general type may include an elastomeric sleeve to e g enhance the airtight fitting of a cartridge nozzle thereinto, as described in U.S. patent application Ser. No. 14/081,396, filed 15 Nov. 2013 and entitled Respirator with Floating Elastomeric Sleeve. In some embodiments, a side (specifically, a proximal end 72) of a cartridge housing may be mated to a receptacle, which receptacle can be mated to a respirator body. Arrangements of this general type are disclosed U.S. Patent Application Publication 2013/0125896 to Dwyer.

In general, a cartridge housing 60 may be secured to a respirator body 310 (e.g., in addition to being at least partially held by the mating of any of the above-recited fluidic connections) by one or more latches, snaps, threads, clasps, connectors, or other suitable complementary features known in the art. In an exemplary embodiment illustrated in FIG. 6, cartridge housing 60 includes a tongue 74 that protrudes from proximal end 72 thereof, which tongue 74 is reversibly engagable with a complementary mating structure 314 of respirator body 310 to form a latch. Tongue 74 may thus, when cartridge housing 60 is e.g. slidably seated against respirator body 310, snap into mating engagement with mating structure 314. When it is desired to remove cartridge housing 60 from the respirator body, manual pressure may be exerted on tongue 74 and/or mating member 314 (depending on the particular design employed) to disengage these components from each other to allow cartridge housing 60 to be slidably disengaged from respirator body 310. Many other configurations may be employed, involving e.g. threadable engaging and disengaging of cartridge housing 60 with respirator body 310, and the like. Cartridge housing 60 and respirator body 310 may include one or more alignment features, such as protrusions, channels, or other suitable alignment features as known in the art, that cooperate to properly align cartridge housing 60 and respirator body 310 for mating.

At a desired time, a user of respirator 300 may replace filter cartridge 1. After any fasteners or latches, if present, have been unlatched, removed, or the like, outward pressure may be applied to the front and/or rear housing portions to move these portions from their second (closed) position, toward a first (open) position. This may be performed manually by a user using fingers, without the use of any special tools. (In various embodiments, the removing of a filter cartridge from a cartridge housing may be performed with the cartridge housing engaged with respirator body 310, or with cartridge housing disengaged from respirator body 310.)

The filter cartridge 1 can then be removed from the cartridge housing. If desired, one edge wall 75 of housing can be bowed out (as exemplified by feature 76 of FIG. 10), away from an edge of the filter cartridge, to provide a space 77 where a fingertip can be inserted between the filter cartridge and the bowed-out wall portion to facilitate removal of the filter cartridge. Once the filter cartridge has been removed, it may be disposed or recycled. A replacement filter cartridge can then be inserted and the cartridge housing closed.

Although embodiments have been described herein in which a second, lid portion of the cartridge housing is moved relative to a first, main housing portion, the moving of first and second cartridge housing portions relative to each other encompasses all variations such as moving both portions, moving the first portion while the rear second portion remains stationary, and moving the second portion while the first portion remains stationary. Moreover, a housing that is made of two such parts, may use parts of any relative size. In some embodiments, at least the front portion 61 of cartridge housing 60 may be sufficiently transparent to allow a user to determine that a filter cartridge 1 has been properly fitted inside the housing. To facilitate the uses disclosed herein, a kit (e.g., a refill kit with instructions) may be provided that includes a plurality of filter cartridges, e.g. along with at least one cartridge housing if desired.

The ordinary artisan will appreciate that the arrangements disclosed herein can provide that only the filter cartridge 1 need be replaced after use; molded plastic cartridge housing 60 can be retained and a new filter cartridge inserted thereinto. This is to be contrasted with conventional arrangements in which filter media are provided inside molded plastic housings that are discarded along with the filter media, at considerably more cost.

The ordinary artisan will appreciate that the arrangements described so far herein, while focusing on a pleated filter media, are in fact a subset of a general approach in which a filter media (of any type, whether unpleated or pleated) is occluded on two oppositely-facing ends of its four ends by portions of the casing; and, on the other two oppositely-facing ends, the filter media is occluded by an edge seal of hardened adhesive rather than by any portion of the casing. (In the particular configurations shown in the Figures herein, the ends of the filter media that are occluded by casing portions are ends 5 and 5', occluded respectively by casing portions 55 and 55'; the ends that are occluded by an adhesive edge seal are ends 4 and 4', occluded respectively by edge seals 40 and 40'.) Such a filter cartridge may thus resemble the exemplary cartridge shown in FIG. 1 in e.g. overall size, shape and/or aspect ratio except that the filter media may possibly differ from the pleated media shown in FIG. 1.

In some embodiments in which the filter media is not pleated, the filter media may be a porous block (e.g. a monolith, e.g. of activated carbon or the like), with first and second, oppositely-facing major sides and with first and second oppositely facing ends that are occluded by portions of the casing, and with third and fourth oppositely facing ends that are occluded by an adhesive edge seal. (The first and second major sides may of course be respectively covered by major portions of the casing, which casing portions will each include an air-permeable area in the general manner already described.)

In embodiments of this type, the adhesive may be of any suitable type as discussed earlier herein, e.g. a hot-melt adhesive. In such embodiments the adhesive may be applied to the third and fourth ends of the filter media by being coated thereon; or, the third and fourth ends of the filter media may each be dipped into the adhesive. Such arrangements are thus an alternative to applying an adhesive in the form of a bead as was discussed earlier herein; it will be appreciated that such approaches may not necessarily produce an adhesive edge seal of the previously-described type that is inwardly proximate to the third (or fourth) end of the filter media. Furthermore, it is emphasized that the approach of coating the adhesive onto third and fourth ends of the filter media, or dipping the third and fourth ends of the filter media into the adhesive, are not limited to a filter media in the form of a block; rather, this could be done for a pleated filter if desired. However, in many embodiments it may be preferred to deposit an adhesive bead for the reasons discussed above, if the filter media is pleated. In some embodiments, of course, both an adhesive bead and a coated or dipped adhesive may be used in combination.

Any suitable non-pleated filter media may be used in the above approach; such a non-pleated filter media may be configured to filter (e.g., capture) particles, vapors, or gases, or any combination thereof. In particular embodiments as noted, the filter media may be made e.g. of carbon particles that are bonded together by the use of any suitable binding agent, to form a porous monolithic block.

Figure 12:
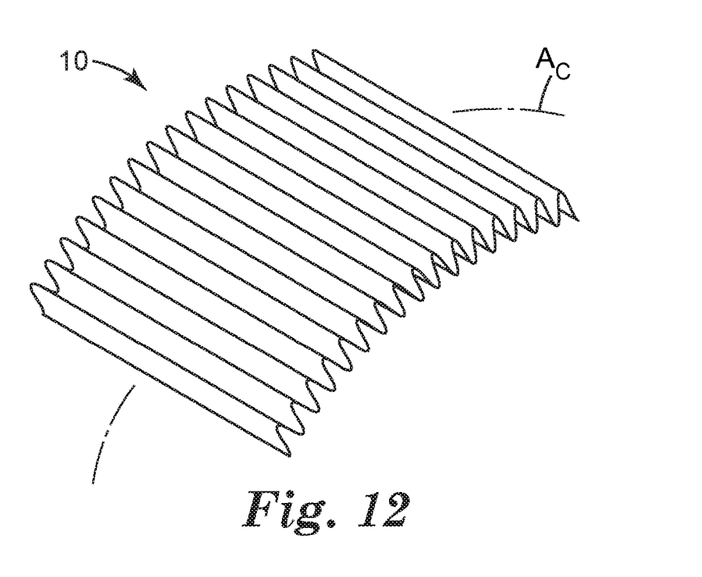
FIG. 12 is a perspective view of an exemplary pleated filter media, in an arcuate shape.

Although the discussions above have focused on a filter media 10 and filter cartridge 1 that are essentially flat (planar) in their overall shape (e.g., resembling a pack of playing cards in size and shape), in other embodiments the filter media and resulting filter cartridge may be arcuate (as shown in exemplary embodiment in FIG. 12). This may be achieved e.g. by conforming the filter media to a first arcuate casing portion, and bonding the first major side of the media to the first arcuate casing portion, and then applying a second arcuate casing portion to the second major side of the media and bonding it thereto. The above-described adhesive beads may be deposited at any suitable point along this process, as desired. In such manner an arcuate (arched) filter cartridge, with appropriate stiffness as provided e.g. by the adhesive dams, and with the corrugated edges occluded by the adhesive edge seals, may be obtained. The internal surfaces of the cartridge housing (e.g., of first and second housing portions) may be shaped to receive and securely hold such an arcuate filter cartridge. Although such a cartridge may not longer be front-rear reversible, it may have other advantages in terms of e.g. aesthetics, allowing the cartridge housing to be curved so as to follow the contours of a user's cheek, and so on.

It will be noted that the arrangements disclosed herein, in which the pleated filter media only comprises casing portions on four of the six faces of the media, allow the pleated filter media to more easily be provided in an arcuate configuration. That is, the ordinary artisan would appreciate that if casing portions were provided outwards of corrugated edges 4 and 4', they would interfere with the ability to curve the pleated media in the manner shown in FIG. 12. That is, such casing portions would likely have to be cut to the proper arcuate shape and then put into position along edges 4 and 4' and attached thereto, after the pleated media had already been deformed into an arcuate shape. The absence of such casing portions in the present arrangement, allows a much less cumbersome manufacturing procedure to be used.

An arcuate pleated filter media 10 and cartridge 1 may be conveniently characterized by way of the average radius of curvature of the arcuate pleated filter media. If a pleated filter media 10 is in a nominally planar configuration (e.g., as in FIGS. 1-5), the average radius of curvature will approach infinity. If pleated filter media 10 is arcuate, the average radius of curvature (measured by way of arcuate axis $A_c$ as shown in FIG. 12) may be e.g. less than about 100 cm. In specific embodiments, the average radius of curvature $A_c$ may be less than about 50, 40, 30, 25, 20, 15, or 10 cm. In further embodiments, the average radius of curvature may be at least about 4, 6, 8, 10, 15, 20, or 25 cm.

The average radius of curvature is taken along the lateral length (along arcuate axis $A_c$) of the pleated filter media 10. The average is used in view of the fact that the radius of curvature may vary at least somewhat along axis $A_c$. In some embodiments the radius of curvature may be at least generally, substantially, or essentially constant along axis $A_c$ (ignoring the local variations due to the pleats). In other embodiments, the radius of curvature may vary along axis $A_c$.

In at least some embodiments an arcuate pleated filter media 10 will exhibit a shape with single curvature, with the curvature being orthogonal to the pleat direction, e.g. as shown in FIG. 12. Such a configuration will be contrasted with a shape that exhibits compound curvature (such as e.g. a section of a sphere, paraboloid or hyperboloid). This can minimize the chance of any wrinkling or crumpling of the pleated media when it is curved into an arcuate configuration. It will be appreciated that such single-curvature embodiments will be distinguished from filters (in e.g. respirator masks) that are formed into complex, compound-curvature shapes so as to conform to e.g. a human face. The ordinary artisan will appreciate that the above-mentioned non-pleated filter media (e.g. a monolithic block) may also be provided and used in arcuate form, in similar manner as described for the pleated media.

LIST OF EXEMPLARY EMBODIMENTS

Embodiment 1 is a filter cartridge comprising: a filter media comprising a first major side and a second, oppositely-facing major side and first and second oppositely-facing ends, and third and fourth oppositely-facing ends; wherein the filter cartridge comprises a casing with a first major portion that resides outwardly of the first major side of the filter media and includes a first air-permeable area, and with a second major portion that resides outwardly of the second major side of the filter media and that includes a second air-permeable area; wherein the casing also comprises a first end portion that resides outwardly of, and occludes, the first end of the filter media, and a second end portion that resides outwardly of, and occludes, the second of the filter media; and wherein the third end of the filter media is occluded by a first edge seal of hardened adhesive, and wherein the fourth end of the filter media is occluded by a second edge seal of hardened adhesive.

Embodiment 2 is the filter cartridge of embodiment 1 wherein the casing does not include any casing portion that resides outwardly of the third end of the filter media and does not include any casing portion that resides outwardly of the fourth end of the filter media. Embodiment 3 is the filter cartridge of any of embodiments 1-2 wherein the casing is comprised of paperboard and wherein the first and second air-permeable areas of the casing are provided by a plurality of perforations in each of the first and second air-permeable areas of the paperboard. Embodiment 4 is the filter cartridge of any of embodiments 1-3 wherein the filter cartridge is front-rear symmetric and reversible so that it can be installed in a cartridge housing with either the first major side of the cartridge facing frontward and the second major side of the cartridge facing rearward, or with the first major side of the cartridge facing rearward and the second major side of the cartridge facing forward.

Embodiment 5 is the filter cartridge of any of embodiments 1-4 wherein the casing is adhesively bonded to the filter media and wherein the casing is provided by first and second casing parts that are each adhesively bonded to the filter media and are also adhesively bonded to each other. Embodiment 6 is the filter cartridge of any of embodiments 1-5 wherein the filter media is a non-pleated, porous block. Embodiment 7 is the filter cartridge of any of embodiments 1-6 wherein the first air-permeable area of the first major portion of the casing is a central air-permeable area and wherein a first air-impermeable perimeter area of the first major portion of the casing surrounds the central first air permeable area; and, wherein the second air-permeable area of the second major portion of the casing is a central air-permeable area and wherein a second air-impermeable perimeter area of the second major portion of the casing surrounds the central second air permeable area.

Embodiment 8 is a cartridge housing comprising a filter cartridge of any of embodiments 1-7 installed therein, the cartridge housing comprising a first major housing portion with a front-facing major side that is air-impermeable, and comprising a second major housing with a rear-facing major side that is air-permeable, wherein the second major housing portion is movable relative to the first major housing portion between a first, open position in which a filter cartridge can be installed into the housing, and a second, closed position in which the second major housing portion exerts a compressive force on a rear surface of the filter cartridge so as to securely hold the filter cartridge within the housing. Embodiment 9 is the cartridge housing of embodiment 8, wherein the first major housing portion comprises a resilient gasket that, when the cartridge is secured in the cartridge housing, is in contact with a perimeter area of a front surface of the filter cartridge. Embodiment 10 is the cartridge housing of embodiment 9 wherein the first major housing portion comprises a rear-facing receiving surface upon which the resilient gasket rests. Embodiment 11 is the cartridge housing of embodiment 10 wherein the rear-facing receiving surface of the first major housing portion is planar and is configured to accept a flat filter cartridge. Embodiment 12 is the cartridge housing of embodiment 10 wherein the rear-facing receiving surface of the first major housing portion is arcuate and is configured to accept an arcuate filter cartridge.

Embodiment 13 is the cartridge housing of any of embodiments 8-12 wherein the first major housing portion comprises a first complementary mating feature, and wherein the second major housing portion comprises a second complementary mating feature that is complementary to the first complementary mating feature of the first major housing portion, and wherein the first and second complementary mating features collectively provide a latch that, when the second major housing portion is in the second, closed position, holds the second major housing portion in the closed position and causes the second major housing portion to exert a compressive force against the rear surface of the filter cartridge.

Embodiment 14 is the cartridge housing of any of embodiments 8-13 wherein the first major housing portion at least partially defines an interior space that, when a filter cartridge is installed in the cartridge housing and the second major housing portion is in the closed position, provides a plenum that is located rearwardly of the filter cartridge and that receives filtered air that flows through the filter cartridge, and wherein the cartridge housing comprises an air-exit passage that is located at a proximal end of the cartridge housing and that fluidly connects the plenum of the cartridge housing, to a respirator body. Embodiment 15 is the cartridge housing of any of embodiments 8-14 wherein the cartridge housing comprises at least one side that is bowed outwardly away from an end of the filter cartridge so that when the lid portion is in the open position, a finger can be inserted into the space between the side of the cartridge housing and the end of the filter cartridge, in order to manually remove the filter cartridge from the cartridge housing.

Embodiment 16 is the cartridge housing of any of embodiments 8-15 wherein the filter cartridge is installable in the cartridge housing so that either a first major side, or a second major side, of the filter cartridge faces rearward. Embodiment 17 is the cartridge housing of any of embodiments 8-16 wherein at least the first major housing portion is transparent. Embodiment 18 is the cartridge housing of any of embodiments 8-17 wherein at least one additional layer of filtration material that is not a part of the filter cartridge, is installed within the cartridge housing.

Embodiment 19 is a kit comprising a plurality of filter cartridges of any of embodiments 1-7.

Embodiment 20 is a respirator comprising a respirator body with a cartridge housing fluidly connected thereto, the cartridge housing being a cartridge housing of any of embodiments 8-18 and comprising a filter cartridge of any of embodiments 1-7 installed therein. Embodiment 21 is the respirator of embodiment 20 wherein the cartridge housing is fluidly connected to the respirator body by way of a connection that is located at a proximal end of the cartridge. Embodiment 22 is the respirator of any of embodiments 20-21 wherein the cartridge housing is a first cartridge housing that is fluidly connected to the respirator body, and wherein the respirator further comprises a second cartridge housing that is fluidly connected to the same respirator body. Embodiment 23 is the respirator of any of embodiments 20-22 wherein the respirator is a half-mask respirator, a full-mask respirator, or a powered-air respirator.

Embodiment 24 is a pleated filter cartridge comprising: a pleated filter media comprising a first major side and a second, oppositely-facing major side and comprising a plurality of oppositely-facing pleats with a pleat direction and with a plurality of first-side pleat tips and first-side pleat valleys and second-side pleat tips and second-side pleat valleys; wherein the pleated filter media comprises a first corrugated end and a second corrugated end; and, a first noncorrugated end and a second noncorrugated end; wherein the pleated filter cartridge comprises a casing with a first major portion that resides outwardly of the first major side of the pleated filter media and includes a first air-permeable area, with a second major portion that resides outwardly of the second major side of the pleated filter media and that includes a second air-permeable area, and wherein the casing also comprises a first end portion that resides outwardly of, and occludes, the first noncorrugated end of the pleated filter media, and a second end portion that resides outwardly of, and occludes, the second noncorrugated end of the pleated filter media; and wherein the first corrugated end of the pleated filter media is occluded by a first edge seal of hardened adhesive that resides within the first-side pleat valleys and the second-side pleat valleys of the pleated filter media at a location inwardly proximate the first corrugated end of the pleated filter media and that extends along an entire lateral extent of the pleated filter media, and wherein the second corrugated end of the pleated filter media is occluded by a second edge seal of hardened adhesive that resides within the first-side pleat valleys and the second-side pleat valleys of the pleated filter media at a location inwardly proximate the second corrugated end of the pleated filter media and that extends along the entire lateral extent of the pleated filter media.

Embodiment 25 is the pleated filter cartridge of embodiment 24 comprising at least one additional seal of hardened adhesive that is located between the first edge seal of hardened adhesive and the second edge seal of hardened adhesive and that extends along the entire lateral extent of the pleated filter media. Embodiment 26 is the pleated filter cartridge of any of embodiments 24-25 wherein the pleated filter media exhibits a pleat spacing of less than about three millimeters. Embodiment 27 is the pleated filter cartridge of any of embodiments 24-26 wherein the pleated filter media exhibits a pleat height of from about five millimeters to about fifteen millimeters. Embodiment 28 is the pleated filter cartridge of any of embodiments 24-27 wherein the pleated filter media exhibits a tightly pleated configuration in which nearest-neighbor pairs of pleat walls are substantially parallel to each other over at least about 90% of the pleat distance of each wall. Embodiment 29 is the pleated filter cartridge of embodiment 28 wherein the pleated filter media exhibits a pleat spacing of less than about three millimeters and exhibits a pleat height of from about five millimeters to about fifteen millimeters. Embodiment 30 is the pleated filter cartridge of any of embodiments 24-28 wherein the pleated filter media is a multilayer filter media that includes a pre-filter layer.

Embodiment 31 is the cartridge housing of any of embodiments 8-18 comprising a pleated filter cartridge of any of embodiments 24-29 installed therein. Embodiment 32 is the respirator of any of embodiments 20-23 comprising a pleated filter cartridge of any of embodiments 24-29 installed in a cartridge housing thereof.

Examples

Working Examples

A roll of flat filter media was obtained, comprised of a high filtration efficiency nonwoven web comprising fine synthetic fibres held together with a binder system. The flat filter media was passed through a scoring roller set of a pleating apparatus, that formed score lines in the media. The score lines were spaced so as to establish a nominal pleat height ($P_h$) of approximately 10 mm in the final pleated product. The filter media, still in flat form, was then passed through adhesive-deposition manifolds in which beads of hot melt adhesive were applied to both sides of the flat media (with the long axes of the beads extending in a direction orthogonal to the score lines). Four beads were applied to each side, at a nominal spacing of approximately 25 mm, with the two outermost beads on each side each being applied in a location so that they would be proximal to (e.g., approximately within a millimeter or two of) first and second corrugated ends of the filter media of the final product. The width of each bead (along the pleating direction of the media) was estimated to be in the range of 1-2 mm.

The scored filter media bearing the hot melt adhesive beads thereon was then passed through a folding section of the pleating apparatus. In the folding section of the apparatus, the scored filter media was decelerated which caused the scored filter media to fold along the score lines so as to form well-defined pleats. The timing and temperatures were managed such that the adhesive was still sufficiently flowable during this operation to sufficiently fill into the pleat valleys that were formed in this stage of the operation. Additionally, the adhesive was still sufficiently tacky at the surface so that two portions of an adhesive bead, if meeting in a pleat valley, could adequately bond to each other. The folding/pleating was performed so as to provide a tightly pleated media, with a pleat spacing ($P_s$) that was estimated to be approximately 1.6 mm (and a pleat height $P_h$ of approximately 10 mm).

The adhesive was then allowed to harden (set) which served to provide a pleated filter media with stable pleat spacing (of approximately 1.6 mm) and with sufficient mechanical integrity and rigidity to be handled. The pleated filter media was then cut into pleat blocks having dimensions of approximately 75 mm (along the pleat direction $D_p$ of the media)×58 mm (along the lateral direction $D_l$ of the media)×10 mm (in pleat height $P_h$).

A first piece of paperboard (thickness approximately 0.6 mm) was held on a flat surface of a fixture. This first paperboard piece featured parallel score marks in at an appropriate distance from the edges to permit folding to create corners and sides of a cartridge casing. The paperboard piece also had an area that was perforated to provide air permeability. A bead of hot melt adhesive was applied to the flat major surface of the first paperboard piece, in a continuous rectangular pattern. A pleat block was then quickly pressed into the adhesive of the first paperboard piece, followed by quickly folding up two edges of the paperboard (at folds defined by the score locations) up to approximately 90 degrees orientation. The pleat block was oriented so that the two edges of the paperboard piece were each folded up outwardly of a noncorrugated edge of the pleated filter media. Sufficient residence time was then allowed for the hot melt adhesive to set.

A second piece of paperboard was provided that was substantially similar to the first paperboard piece except that the score lines were spaced so as to allow the folded-up edges to reside outwardly of the folded-up edges of the first paperboard piece. A hot melt adhesive was applied to the second paperboard piece in similar manner to the first piece, after which the pleat block (with the first paperboard piece bonded thereto) was pressed against the second paperboard piece (with the first paperboard piece on the opposite side of the pleated media from the second paperboard piece). The edges of the second paperboard piece were then folded up to approximately 90 degrees orientation, so that they resided outwardly of the folded up edges of the first paperboard piece, with the each edge of the second paperboard piece being bonded to an edge of the first paperboard piece by the hot melt adhesive. This hot melt adhesive was then allowed to set. The pleated filter media was thus adhesively bonded to each of the two paperboard pieces, as well as the edges of the two paperboard pieces being bonded to each other. This process resulted in a completed filter cartridge having a rectangular box like geometry, measuring approximately 75 mm×60 mm×12 mm, and in which four of the six faces of the cartridge (the first and second major surfaces, and the first and second noncorrugated ends) were encased by a paperboard casing, with the first and second noncorrugated ends being encased by two thicknesses of the paperboard (as a result of overlapping the edges of the second paperboard piece over the edges of the first paperboard piece).

The first and second corrugated ends of the pleated media were not encased by the casing. However, first and second adhesive edge seals were present, proximal to the first and second corrugated edges of the pleated filter media. Completed filter cartridges were tested to ensure to ensure a leak tight seal by means of a penetrometer instrument designed to challenge filters against a submicron aerosol. The expected performance of the pleated filter media was obtained, indicating that the adhesive dams were satisfactorily occluding the corrugated edges of the pleated filter media.

Cartridge housings very similar to those shown in the Figures herein were made by molding a first major housing portion (which was transparent), a lid portion, and hingedly connecting the lid portion to the first major housing portion. A gasket very similar to that shown in FIG. 10 was positioned on a receiving surface of the first major housing portion, again in similar manner as shown in FIG. 10. The gasket was made of resilient foam rubber with a thickness of approximately 2 mm. A filter cartridge made as described above was inserted into the interior of the cartridge housing and the lid closed and latched. The filter cartridge was held (pressed between the lid and first major housing portion, with the gasket in place between the perimeter edge of the filter cartridge and the first major housing portion) securely in place without any unacceptable leakage of air, e.g. around the edges of the filter cartridge.

What is claimed is:

1. A cartridge housing comprising a filter cartridge installed therein, the cartridge housing comprising a major housing portion with a front-facing major side that is air-impermeable, and comprising a lid portion with a rear-facing major side that is air-permeable, wherein the lid portion is movable relative to the major housing portion between a first, open position in which a filter cartridge can be installed into the housing, and a second, closed position in which the lid portion exerts a compressive force on a rear surface of the filter cartridge so as to securely hold the filter cartridge within the housing;

and wherein the filter cartridge is a pleated filter cartridge comprising:
a pleated filter media comprising a first major side and a second, oppositely-facing major side and comprising a plurality of oppositely-facing pleats with a pleat direction and with a plurality of first-side pleat tips and first-side pleat valleys and second-side pleat tips and second-side pleat valleys;

wherein the pleated filter media comprises a first corrugated end and a second corrugated end; and, a first noncorrugated end and a second noncorrugated end;

wherein the pleated filter cartridge comprises a casing with a first major portion that resides outwardly of the first major side of the pleated filter media and includes a first air-permeable area, with a second major portion that resides outwardly of the second major side of the pleated filter media and that includes a second air-permeable area, and wherein the casing also comprises a first end portion that resides outwardly of, and occludes, the first noncorrugated end of the pleated filter media, and a second end portion that resides outwardly of, and occludes, the second noncorrugated end of the pleated filter media;

and wherein the first corrugated end of the pleated filter media is occluded by a first edge seal of hardened adhesive that resides within the first-side pleat valleys and the second-side pleat valleys of the pleated filter media at a location inwardly proximate the first corrugated end of the pleated filter media and that extends along an entire lateral extent of the pleated filter media, and wherein the second corrugated end of the pleated filter media is occluded by a second edge seal of hardened adhesive that resides within the first-side pleat valleys and the second-side pleat valleys of the pleated filter media at a location inwardly proximate the second corrugated end of the pleated filter media and that extends along the entire lateral extent of the pleated filter media.

2. The cartridge housing of claim 1, wherein the major housing portion comprises a resilient gasket that, when the cartridge is secured in the cartridge housing, is in contact with a perimeter area of a front surface of the filter cartridge.

3. The cartridge housing of claim 2 wherein the major housing portion comprises a rear-facing receiving surface upon which the resilient gasket rests.

4. The cartridge housing of claim 3 wherein the rear-facing receiving surface of the major housing portion is planar and is configured to accept a flat filter cartridge.

5. The cartridge housing of claim 3 wherein the rear-facing receiving surface of the major housing portion is arcuate and is configured to accept an arcuate filter cartridge.

6. The cartridge housing of claim 1 wherein the major housing portion comprises a first complementary mating feature, and wherein the lid portion comprises a second complementary mating feature that is complementary to the first complementary mating feature of the major housing portion, and wherein the first and second complementary mating features collectively provide a latch that, when the lid portion is in the second, closed position, holds the lid portion in the closed position and causes the lid portion to exert a compressive force against the rear surface of the filter cartridge.

7. The cartridge housing of claim 1 wherein the major housing portion at least partially defines an interior space that, when a filter cartridge is installed in the cartridge housing and the lid portion is in the closed position, provides a plenum that is located rearwardly of the filter cartridge and that receives filtered air that flows through the filter cartridge, and wherein the cartridge housing comprises an air-exit passage that is located at a proximal end of the cartridge housing and that fluidly connects the plenum of the cartridge housing, to a respirator body.

8. The cartridge housing of claim 1 wherein the cartridge housing comprises at least one side that is bowed outwardly away from an end of the filter cartridge so that when the lid portion is in the open position, a finger can be inserted into the space between the side of the cartridge housing and the end of the filter cartridge, in order to manually remove the filter cartridge from the cartridge housing.

9. The cartridge housing of claim 1 wherein the filter cartridge is installable in the cartridge housing so that either a first major side, or a second major side, of the filter cartridge faces rearward.

10. The cartridge housing of claim 1 wherein at least the major housing portion is transparent.

11. The cartridge housing of claim 1 wherein at least one additional layer of filtration material that is not a part of the filter cartridge, is installed within the cartridge housing.

12. A kit comprising a plurality of filter cartridges of claim 1.

13. A respirator comprising a respirator body with a cartridge housing fluidly connected thereto, the cartridge housing comprising a filter cartridge of claim 1 installed therein; and, the cartridge housing comprising a first major housing portion with a front-facing major side that is air-impermeable, and comprising a second major housing portion with a rear-facing major side that is air-permeable, wherein the second major housing portion is movable relative to the first major housing portion between a first, open position in which a filter cartridge can be installed into the housing, and a second, closed position in which the second major housing portion exerts a compressive force on a rear surface of the filter cartridge so as to securely hold the filter cartridge within the housing.

14. The respirator of claim 13 wherein the cartridge housing is fluidly connected to the respirator body by way of a connection that is located at a proximal end of the cartridge.

15. The respirator of claim 13 wherein the cartridge housing is a first cartridge housing that is fluidly connected to the respirator body, and wherein the respirator further comprises a second cartridge housing that is fluidly connected to the same respirator body.

16. The respirator of claim 13 wherein the respirator is a half-mask respirator, a full-mask respirator, or a powered-air respirator.

17. The pleated filter cartridge of claim 1 comprising at least one additional seal of hardened adhesive that is located between the first edge seal of hardened adhesive and the second edge seal of hardened adhesive and that extends along the entire lateral extent of the pleated filter media.

18. The pleated filter cartridge of claim 1 wherein the pleated filter media exhibits a pleat spacing of less than three millimeters.

19. The pleated filter cartridge of claim 1 wherein the pleated filter media exhibits a pleat height of from five millimeters to fifteen millimeters.

20. The pleated filter cartridge of claim 1 wherein the pleated filter media exhibits a pleated configuration in which nearest-neighbor pairs of pleat walls are substantially parallel to each other over at least 90% of the pleat distance of each wall.

21. The pleated filter cartridge of claim 20 wherein the pleated filter media exhibits a pleat spacing of less than three millimeters and exhibits a pleat height of from five millimeters to fifteen millimeters.

22. The pleated filter cartridge of 1 wherein the pleated filter media is a multilayer filter media that includes a pre-filter layer.

23. The filter cartridge of claim 1 wherein the casing does not include any casing portion that resides outwardly of the first corrugated end of the filter media and does not include any casing portion that resides outwardly of the second corrugated end of the filter media.

24. The filter cartridge of claim 1 wherein the casing is comprised of paperboard and wherein the first and second air-permeable areas of the casing are provided by a plurality of perforations in each of the first and second air-permeable areas of the paperboard.

25. The filter cartridge of claim 1 wherein the filter cartridge is front-rear symmetric and reversible so that it can be installed in a cartridge housing with either the first major side of the cartridge facing frontward and the second major side of the cartridge facing rearward, or with the first major side of the cartridge facing rearward and the second major side of the cartridge facing forward.

26. The filter cartridge of claim 1 wherein the casing is adhesively bonded to the pleated filter media and wherein the casing is provided by first and second casing parts that are each adhesively bonded to the pleated filter media and are also adhesively bonded to each other.

27. The filter cartridge of claim 1 wherein the first air-permeable area of the first major portion of the casing is a central air-permeable area and wherein a first air-impermeable perimeter area of the first major portion of the casing surrounds the central first air permeable area; and, wherein the second air-permeable area of the second major portion of the casing is a central air-permeable area and wherein a second air-impermeable perimeter area of the second major portion of the casing surrounds the central second air permeable area.

\* \* \* \* \*